United States Patent Office 3,663,500
Patented May 16, 1972

3,663,500
UNSATURATED POLYESTER RESINS ADMIXED WITH POLYURETHANES OR CYCLOALIPHATIC DIEPOXIDES
John Dinsdale Crabtree, Rainhill, near Liverpool, Kenneth Henry Grundy, Ashton-on-Mersey, Sale, and Alan Edward Johnson, Sutton Leach, St. Helens, England, assignors to Fibreglass Limited, Liverpool, England
No Drawing. Filed June 2, 1969, Ser. No. 829,734
Claims priority, application Great Britain, June 4, 1968, 26,470/68
Int. Cl. C08g 51/10, 17/10
U.S. Cl. 260—40 R
7 Claims

ABSTRACT OF THE DISCLOSURE

A polyester resin for reinforcement by glass fibres is modified by the addition of a urethane, a cycloaliphatic epoxide, or a derivative of a cycloalphatic epoxide with methacrylic acid.

BACKGROUND OF THE INVENTION

The present invention relates to plastics resins and in particular to polyester resins.

Polyester resins are well known. Prior to the present invention considerable attention has been paid to such resins having high water resistance which find particular application, especially when reinforced, for the fabrication of translucent sheeting, pipelines, tanks and special purpose articles. Hitherto one serious disadvantage experienced with translucent sheeting reinforced with glass fibre is that on wet ageing attack occurs at the glass-resin interface and in the polyester resin this involves a decrease in both the mechanical strength and in the translucency of the reinforced material after certain periods of ageing. Visual examination shows that water damage in cured polyester resins may be classified into two categories;

(a) Internal cracking—this may take the form of isolated disc shaped cracks or, in cases of severe damage, intersecting internal crack configurations.
(b) Surface cracking—this resembles the crazing of a ceramic glass and is caused by complex stress systems. These are initiated by water uptake and hydrolysis, causing swelling, which enhances molecular mobility and can promote further double bond polymerisation accompanied by shrinkage. The formation of cracks results in loss of transmission of light and less efficient transfer of stress from the matrix to the glass fibre with a subsequent loss of mechanical properties of the reinforced material.

It is an object of the present invention to provide modified polyester resins in which the prementioned disadvantages are substaitially obviated.

SUMMARY

Accordingly the present invention is a polyester resin modified by the addition of a urethane, a cycloaliphatic epoxide or a derivative of a cycloaliphatic epoxide with methacrylic acid.

The modified polyester resins of the present invention are characterised by exceptional strength, stiffness and translucency both before and after wet ageing. The resins may be reinforced by incorporation of for example glass fibre, the resulting material also exhibiting exceptional strength, stiffness and translucency.

DESCRIPTION OF THE PREFERRED EMBODIMENT

The polyester resin is preferably formed by the reaction of ethylene glycol or propylene glycol with a monomer selected from maleic anhydride, maleic acid, phthalic acid, adipic acid and mixtures of phthalic acid and adipic acid. Suitably the modified resin is subjected to test in a form moulded into a glass laminate. Thus in the following examples squares of glass cloth are initially impregnated with gamma methacryloxypropyl trimethoxysilane (A174) in an acetone/water solution and then air dried overnight. The resin laminate was prepared from a lay up containing 12 plies of the treated cloth and Crystic 195 (including additive), cold cured with cyclohexanone peroxide (Catalyst Paste H) overnight (the accelerator was cobalt naphthenate i.e. Accelerator E) followed by an oven post-cure for 2 hours at 100° C. Flexural tests were carried out on these panels both dry and after 72 hour boil tests. The percentage light transmission was also measured at each stage. Crystic is listed on page 244 of the British Plastics Year Book for Unsaturated Polyester Resins for Low-Pressure Laminating and Casting (Scott Bader & Co. Ltd.).

The results of these tests indicate that the addition of a urethane, cycloaliphatic epoxide or its methacrylic acid as additive derivative considerably improves the wet ageing characteristics of the resin resulting in a material of higher strength and translucency than the unmodified material.

EXAMPLE 1

Urethane derivatives of alkoxy alkyl acrylates methacrylates or propylacrylates in polyester resin systems A derivative was prepared by reacting hydroxypropyl methacrylate with toluene 2:4 diisocyanate in a 2:1 mole ratio. In a smilar manner derivatives may be prepared by reacting a member of the group consisting of toluene 2:4 diisocyanate, toluene 2:6 diisocyanate, diphenyl methane diisocyanate, naphthalene diisocyanate, and hexamethylene diisocyanate, with a member of the group consisting of hydroxyethyl acrylate, hydroxy ethyl methacrylate, hydroxy propylacrylate, and hydroxypropyl methacrylate.

Preparation

|  | G. |
|---|---|
| Hydroxypropylmethacrylate | 432 |
| Toluene 2,4 disocyanate | 261 |

The hydroxypropyl methacrylate was cooled to 10° C. and the toluene 2,4 diisocyanate added dropwise over a period of 15 minutes in a nitrogen atmosphere. The mixture was stirred continuously and the reaction temperature did not rise above 15° C. in the following 2 hours. The agitation was then continued for a further 15 hours at 15–20° C. The resinous product formed in the reaction was included in a polyester resin formulation and used to prepare a 12-ply glass cloth laminate.

Preparation of glass cloth

Acetone: 500 ml.
Deionised water: 500 ml.
A174 silane: 6 g.

The A174 silane was dissolved in the acetone when the deionised water was added with continuous stirring. 15 square feet of glass cloth were impregnated in the silane solution for 15 minutes and then allowed to air dry overnight before laminating.

Laminating resin

|  | G. |
|---|---|
| Crystic 195 | 400 |
| Urethane paste H | 100 |
| Catalyst paste H | 20 |
| Accelerator E | 6 |

The 12-ply laminate was allowed to stand for 24 hours at room temperature than postcured for 2 hours at 100° C.

Results

Combustible material on the glass cloth after treatment with A174: 0.17%
Thickness of the laminate: 0.114%
Dry flexural strength: 85,500 p.s.i.
Flexural strength after immersion for 70 hr. in boiling water: 65,400 p.s.i.

This laminate has evry good initial strength which is maintained well after wet ageing.

EXAMPLE 2

A 12-ply glass cloth laminate was prepared from the following formulation

|   | G. |
|---|---|
| Crystic 195 | 425 |
| 3,4-epoxy cyclohexylmethyl-3,4 epoxy cyclohexane carboxylate | 75 |
| Cobalt naphthenate | 5 |
| Cyclohexanone peroxide | 10 |

This resin laminate was cold cured overnight and postcured for 4 hours at 100° C. Its flexural strength was then measured both before and after wet ageing with the following results:

Thickness _____ 0.114″
Flexural strength, p.s.i.:
  Dry _____ 87,700
  72 hr. boil _____ 57,000
Light transmission, percent:
  Dry _____ 61.0
  72 hr. boil _____ 40.0

This laminate has very good initial strength which is well maintained after long periods of wet ageing.

A laminate was prepared from Crystic 195 with no addition of the cycloaliphatic epoxide, with the following results:

Thickness _____ 0.114″
Flexural strength, p.s.i.:
  Dry _____ 92,500
  72 hr. boil _____ 45,600
Light transmission, percent:
  Dry _____ 58.0
  72 hr. boil _____ 14.5

It is clear that the addition of the cycloaliphatic epoxide considerably improves both the flexural strength and light transmission after long periods of ageing. In a similar manner various cycloaliphatic epoxides may be made use of, such as members of the group consisting of bis (3,4-epoxy-6-methylcyclohexylmethyl) adipate, 3,4-epoxy cyclohexymethyl-3,4-epoxy cyclohexane carboxylate, and cycloaliphatic epoxides having the structural formula:

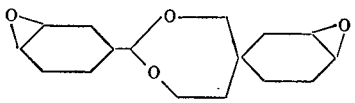

EXAMPLE 3

A resin cast of Crystic 195 was prepared as in the above example and tested for flexural strength both dry and after wet ageing. This was also carried out for the system Crystaic 195+25% toluene diisocyanatehydroxyethyl methacrylate derivative. The results are as follows:

|  | Flexural strength, p.s.i. | | | Strength retention, 24 hrs., percent |
|---|---|---|---|---|
|  | Dry | 6-hr. boil | 25 hrs. |  |
| Crystic 195 | 12,100 | 9,000 | 4,300 | 29.5 |
| Crystic 195 plus 25% TDI-HEMA | 12,200 | 12,300 | 11,000 | 90.2 |

It is evident that addition of 25% urethane to the resin considerably enhances the mechanical properties of the resin cast.

EXAMPLE 4

A 12-ply laminate was prepared from the following formulation

Crystic 195: 500 g.
3,4-epoxy cyclohexylmethyl-3,4-epoxy cyclohexane carboxylate: 74.2 g.
Methacrylic acid: 50.8 g.
Cyclohexanone peroxide: 12.5
Accelerator C: 0.625

This was laminated, cold cured overnight and postcured for 4 hours at 100° C. The laminate had the following properties:

| Thickness, in. | Flexural strength, p.s.i. | | Strength retention, percent, 70-hr. boil |
|---|---|---|---|
|  | Dry | 70-hr. boil |  |
| 0.114 | 93,500 | 57,000 | 61.0 |
| 0.125 | 86,000 | 52,000 | 60.0 |

This glass reinforced laminate possessed good initial strength which is well maintained after weathering.

We claim:
1. A crosslinkable resin composition comprising an unsaturated polyester resin in admixture with an additive selected from the group consisting of a urethane resin and a cycloaliphatic diepoxide selected from the group consisting of bis(3,4-epoxy-6-methylcyclohexylmethyl)adipate, 3,4-epoxy - 6 - methylcyclohexylmethyl - 3,4 - epoxy-6-methylcyclohexane carboxylate, and 3,4 - epoxy-cyclohexylmethyl-3,4-epoxycyclohexane carboxylate, said urethane resin being the product of the reaction in a mole ratio of 1:2, of a diisocyanate and an unsaturated organic compound selected from the group consisting of hydroxyethyl acrylate, hydroxyethyl methacrylate, hydroxypropyl acrylate and hydroxypropyl methacrylate, and said additive being present in an amount of from 5% to 30% by weight of the total weight of the mixture.

2. A resin composition as claimed in claim 1, wherein the polyester is a copolymer of ethylene glycol with a monomer selected from the group consisting of maleic anhydride, maleic acid, phthalic acid, adipic acid, and a mixture of phthalic acid and adipic acid.

3. A resin composition as claimed in claim 1, wherein the polyester is a copolymer of propylene glycol with a monomer selected from the group consisting of maleic anhydride, maleic acid, phthalic acid, adipic acid, and a mixture of phthalic acid and adipic acid.

4. A resin composition as claimed in claim 1, wherein the amount of additive ranges from 10% to 15% by weight based on the total wight of the mixture.

5. A resin composition as claimed in claim 1, wherein the diisocyanate is selected from the group consisting of toluene 2:4 diisocyanate, toluene 2:6 diisocyanate, diphenyl methane diisocyanate, naphthalene diisocyanate, and hexamethylene diisocyanate.

6. A polyester resin as claimed in claim 1, reinforced by incorporation of glass fibre.

7. Translucent plastics resin sheeting whenever produced from a resin composition as claimed in claim 6.

References Cited

UNITED STATES PATENTS

| 3,027,279 | 3/1962 | Kurka et al. | 260—75 Ep X |
| 3,192,287 | 6/1965 | Pelzek et al. | 260—858 |
| 3,227,778 | 1/1966 | Delius | 260—858 X |
| 3,516,955 | 6/1970 | Taft | 260—40 X |

LEWIS T. JACOBS, Primary Examiner

U.S. Cl. X.R.

260—75 E, 858